United States Patent
Jiang et al.

(10) Patent No.: US 12,028,558 B2
(45) Date of Patent: Jul. 2, 2024

(54) METHOD FOR PROCESSING LIVE BROADCAST INFORMATION, ELECTRONIC DEVICE AND STORAGE MEDIUM

(71) Applicant: BAIDU (CHINA) CO., LTD., Shanghai (CN)

(72) Inventors: Wenjun Jiang, Shanghai (CN); Weitao Xu, Shanghai (CN); Guanqing Wang, Shanghai (CN)

(73) Assignee: Baidu (China) Co., Ltd., Shanghai (CN)

( * ) Notice: Subject to any disclaimer, the term of this patent is extended or adjusted under 35 U.S.C. 154(b) by 196 days.

(21) Appl. No.: 17/685,529

(22) Filed: Mar. 3, 2022

(65) Prior Publication Data
US 2022/0191556 A1    Jun. 16, 2022

(30) Foreign Application Priority Data
Mar. 17, 2021  (CN) .......................... 202110289241.2

(51) Int. Cl.
*H04N 21/2187*  (2011.01)
*H04N 21/426*  (2011.01)
(Continued)

(52) U.S. Cl.
CPC ... *H04N 21/2187* (2013.01); *H04N 21/42607* (2013.01); *H04N 21/43072* (2020.08); *H04N 21/4383* (2013.01)

(58) Field of Classification Search
CPC ......... H04N 21/2187; H04N 21/42607; H04N 21/43072; H04N 21/4383; H04N 21/4312;
(Continued)

(56) References Cited

U.S. PATENT DOCUMENTS

2016/0277802 A1 * 9/2016 Bernstein ......... H04N 21/44213
2021/0044640 A1   2/2021 He
(Continued)

FOREIGN PATENT DOCUMENTS

CN    107888968 A    4/2018
CN    108769727 A    11/2018
(Continued)

OTHER PUBLICATIONS

Korean Office Action, Serial No. 10-2022-0032380, dated Apr. 18, 2023.
(Continued)

*Primary Examiner* — Adil Ocak
(74) *Attorney, Agent, or Firm* — Reising Ethington P.C.

(57) ABSTRACT

A method for processing live broadcast information, an electronic device and a storage medium are provided, and relates to the technical field of information flow. The method includes: in response to detecting a first event before receiving a playing instruction for a first live broadcast room, acquiring a first playing frame of the first live broadcast room during a live broadcast process of the first live broadcast room; generating preloaded first kernel data according to the first playing frame; in response to receiving the playing instruction for the first live broadcast room, pulling a live broadcast video stream of the first live broadcast room according to the first kernel data; and playing the live broadcast video stream of the first live broadcast room. The live broadcast lag can be reduced and the user experience can be improved.

15 Claims, 15 Drawing Sheets

(51) Int. Cl.
*H04N 21/43* (2011.01)
*H04N 21/438* (2011.01)

(58) Field of Classification Search
CPC ........... H04N 21/4788; H04N 21/8173; H04N 21/437; H04N 21/440218; H04N 21/44222; H04N 7/15; H04N 21/234; G06F 3/0488
See application file for complete search history.

(56) References Cited

U.S. PATENT DOCUMENTS

| 2021/0084362 A1* | 3/2021 | Chen | H04N 21/8133 |
| 2021/0397933 A1* | 12/2021 | Boesch | H03M 7/6005 |
| 2023/0098060 A1* | 3/2023 | Lin | H04N 21/431 |
| | | | 709/231 |

FOREIGN PATENT DOCUMENTS

| CN | 109729387 A | 5/2019 |
| CN | 110401866 A | 11/2019 |
| CN | 110662086 A | 1/2020 |
| CN | 110958465 A | 4/2020 |
| CN | 111355976 A | 6/2020 |
| JP | 2003009120 A | 1/2003 |
| JP | 2005352539 A | 12/2005 |
| JP | 2010016618 A | 1/2010 |
| JP | 2016184774 A | 10/2016 |
| JP | 2016540286 A | 12/2016 |
| KR | 20120079442 A | 7/2012 |

OTHER PUBLICATIONS

Japanese Office Action, Serial No. 2022-005563, dated Mar. 7, 2023.
Chinese Office Action, Serial No. 2021102892412, dated Dec. 1, 2022.

* cited by examiner

METHOD FOR PROCESSING LIVE BROADCAST INFORMATION, ELECTRONIC DEVICE AND STORAGE MEDIUM

TECHNICAL FIELD

The present disclosure relates to the field of computer technology, and in particular to the technical fields of information flow and the like.

BACKGROUND

With the development of computer technology, the network speed is getting faster and faster. The network has gradually entered the 5G era from the 4G era.

The types of network products are becoming more and more diversified, and people can transmit text and pictures as well as video through the network. Due to the acceleration of network transmission technology and transmission speed, people can not only chat remotely, but also transmit high-definition live broadcast video data remotely, and the video recording terminal and the video picture receiving terminal can interact in real time. Remote live broadcast video can not only be used in the commercial field, which is convenient for users to preview the goods to be purchased in advance through video, but also can be used for remote entertainment, meeting, teaching and so on.

In the 5G era, people have increasingly higher requirements for network use experience, and also for live broadcast experience.

SUMMARY

The present disclosure provides a method and apparatus for processing live broadcast information, an electronic device and a storage medium.

According to an aspect of the present disclosure, there is provided a method for processing live broadcast information, including:

in response to detecting a first event before receiving a playing instruction for a first live broadcast room, acquiring a first playing frame of the first live broadcast room during a live broadcast process of the first live broadcast room;

generating preloaded first kernel data according to the first playing frame;

in response to receiving the playing instruction for the first live broadcast room, pulling a live broadcast video stream of the first live broadcast room according to the first kernel data; and playing the live broadcast video stream of the first live broadcast room.

According to another aspect of the present disclosure, there is provided an electronic device, including:

at least one processor; and a memory communicatively connected to the at least one processor, wherein the memory stores instructions executable by the at least one processor, and the instructions, when executed by the at least one processor, enable the at least one processor to perform the method in any embodiment of the present disclosure.

According to another aspect of the present disclosure, there is provided a non-transitory computer-readable storage medium storing computer instructions, wherein the computer instructions cause a computer to perform the method in any embodiment of the present disclosure.

According to the technology of the present disclosure, the first playing frame of the first live broadcast room is acquired before receiving the playing instruction, the process of acquiring the first playing frame of the first live broadcast room is equivalent to the pre-pull operation of the live broadcast video stream of the first live broadcast room.

It should be understood that the content described in this section is neither intended to limit the key or important features of the embodiments of the present disclosure, nor intended to limit the scope of the present disclosure. Other features of the present disclosure will be readily understood through the following description.

BRIEF DESCRIPTION OF THE DRAWINGS

The drawings are used to better understand the scheme and do not constitute a limitation to the present disclosure, wherein.

DETAILED DESCRIPTION

Exemplary embodiments of the present disclosure are described below in combination with the drawings, including various details of the embodiments of the present disclosure to facilitate understanding, which should be considered as exemplary only. Thus, those of ordinary skill in the art should realize that various changes and modifications can be made to the embodiments described here without departing from the scope and spirit of the present disclosure. Likewise, descriptions of well-known functions and structures are omitted in the following description for clarity and conciseness.

Figure 1:
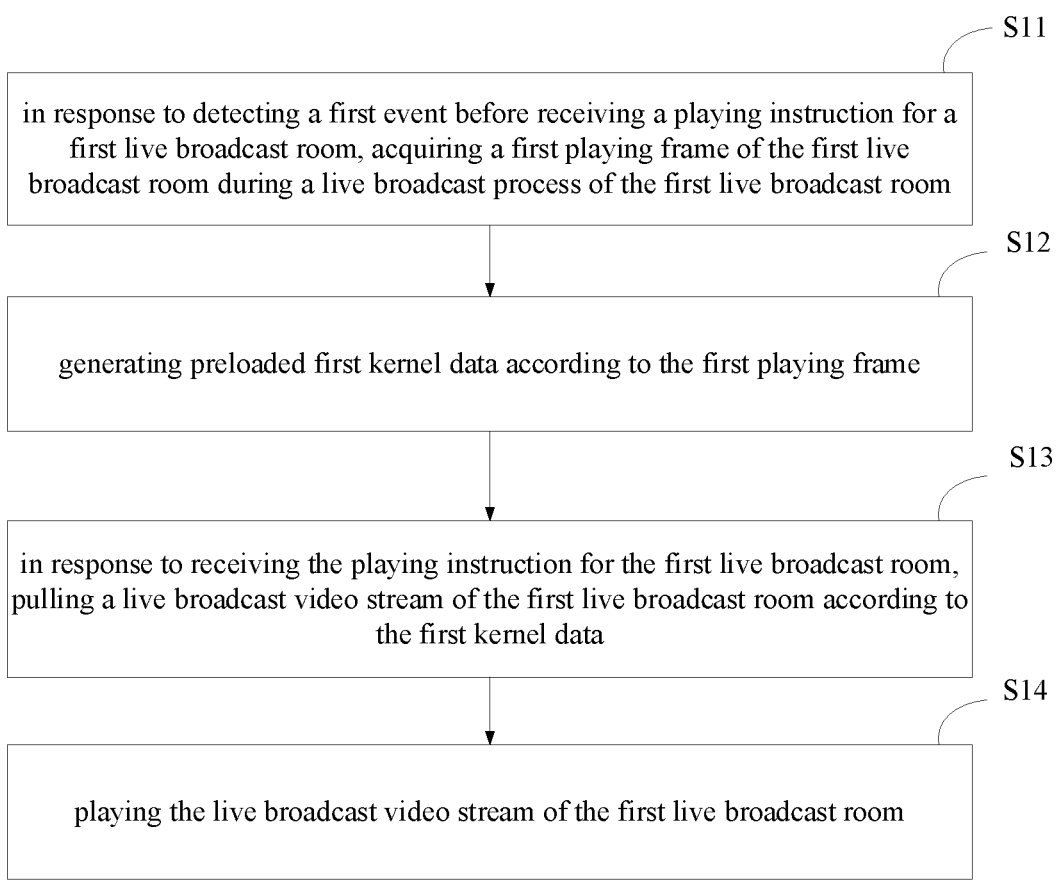
FIG. 1 is a schematic flowchart of a method for processing live broadcast information according to an embodiment of the present disclosure.

An embodiment of the present disclosure first provides a method for processing live broadcast information, as shown in FIG. 1, including:

S11, in response to detecting a first event before receiving a playing instruction for a first live broadcast room, acquiring a first playing frame of the first live broadcast room during a live broadcast process of the first live broadcast room;

S12, generating preloaded first kernel data according to the first playing frame;

S13, in response to receiving the playing instruction for the first live broadcast room, pulling a live broadcast video stream of the first live broadcast room according to the first kernel data; and S14, playing the live broadcast video stream of the first live broadcast room.

In this embodiment, the playing instruction for the first live broadcast room can be the playing instruction for the first live broadcast room issued by a user by clicking a live broadcast card. As shown in FIG. 12C, the user touches a live broadcast card (corresponding to the first live broadcast room) in an APP display interface with his/her finger 123 on a touch screen to issue the playing instruction.

The playing instruction for the first live broadcast room may also be an instruction issued by the user for switching between live broadcast rooms by sliding or the like to cause the video of the first live broadcast room to be played.

The playing instruction for the first live broadcast room can also be an instruction for the user to directly enter the first live broadcast room by clicking a link, scanning a code or the like.

The first live broadcast room can be a live broadcast room opened by a special live broadcast platform, or a live broadcast room created by a function related to live video in tools such as a teleconference and a network conference.

For example, the user can enter the first live broadcast room through a live broadcast application.

For another example, the user can turn on a video function through a conference application, which is equivalent to transmitting the video data stream at both ends to achieve the live broadcast effect. In this case, a video playing module corresponding to one end of the recorded video can also be regarded as the first live broadcast room.

The first event can be a trigger event for preloading the video stream of the first live broadcast room. For example, the user browses network information through an Application (APP), and the network information includes live broadcast cards, so the first event may include entrance of a live broadcast card of the first live broadcast room into a display interface of the APP.

For another example, the user browses network information through an APP, and the network information includes live jump links or live jump QR codes, so the first event may include entrance of a live jump link or a live jump QR code of the first live broadcast room into a display interface of the APP.

Figure 12A:
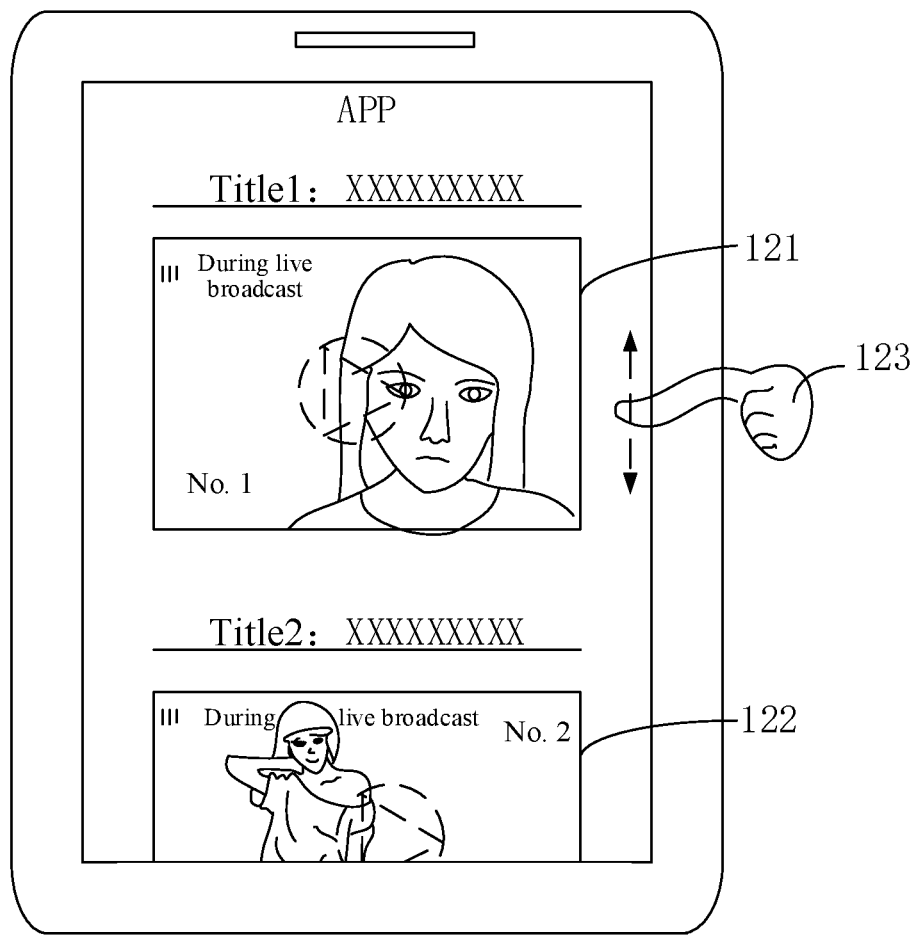
FIGS. 12A-C are schematic diagrams of a first event according to an example of the present disclosure.

As shown in FIG. 12A, in an implementation, a No.1 live broadcast room 121 completely enters into a display interface of an APP, and hence it is considered that the first event has happened to the No.1 live broadcast room 121, at this time, the user has not clicked or triggered the live broadcast of the No.1 live broadcast room, that is, the user has not sent the playing instruction, and S11-S14 shown in FIG. 1 can be executed.

Still referring to FIG. 12A, a No.2 live broadcast room 122 has not completely entered into the display interface of the APP, and it is considered that the first event has not happened to the No.2 live broadcast room 122. at this time, although the user has not clicked or triggered the live broadcast of the No.1 live broadcast room, that is, the user has not sent the playing instruction, steps shown in FIG. 1 may not be executed.

The user can slide the touch screen up and down with his/her finger 123, so that the No.2 live broadcast room completely enters into the display interface of the APP, which makes the first event happen to the No.2 live broadcast room.

In another implementation, when a link or a title of a live broadcast room (such as title 1 and title 2 shown in FIG. 12) enters into the display interface of the APP, it can be considered that the first event happens.

Figure 12B:
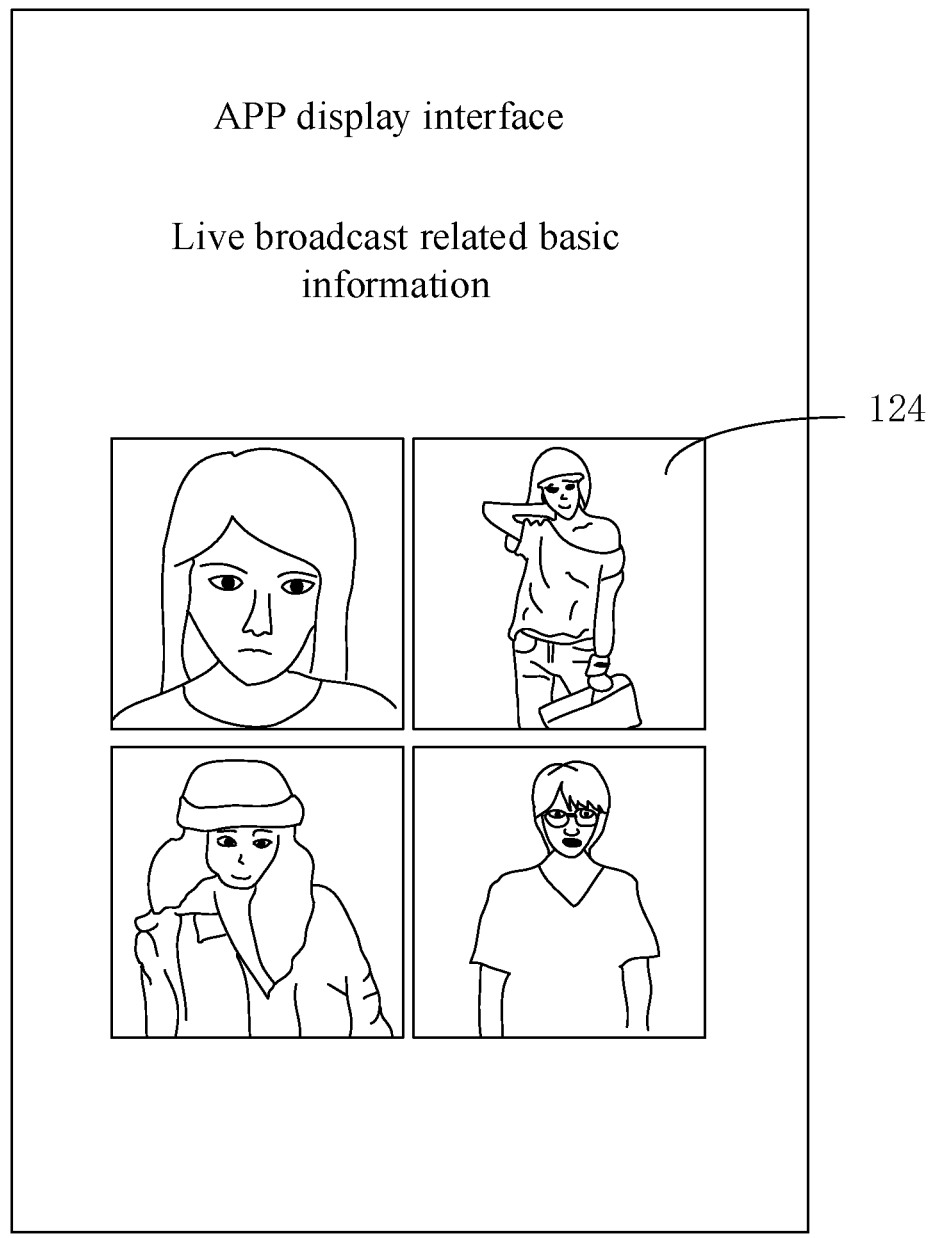
Figure 12C:
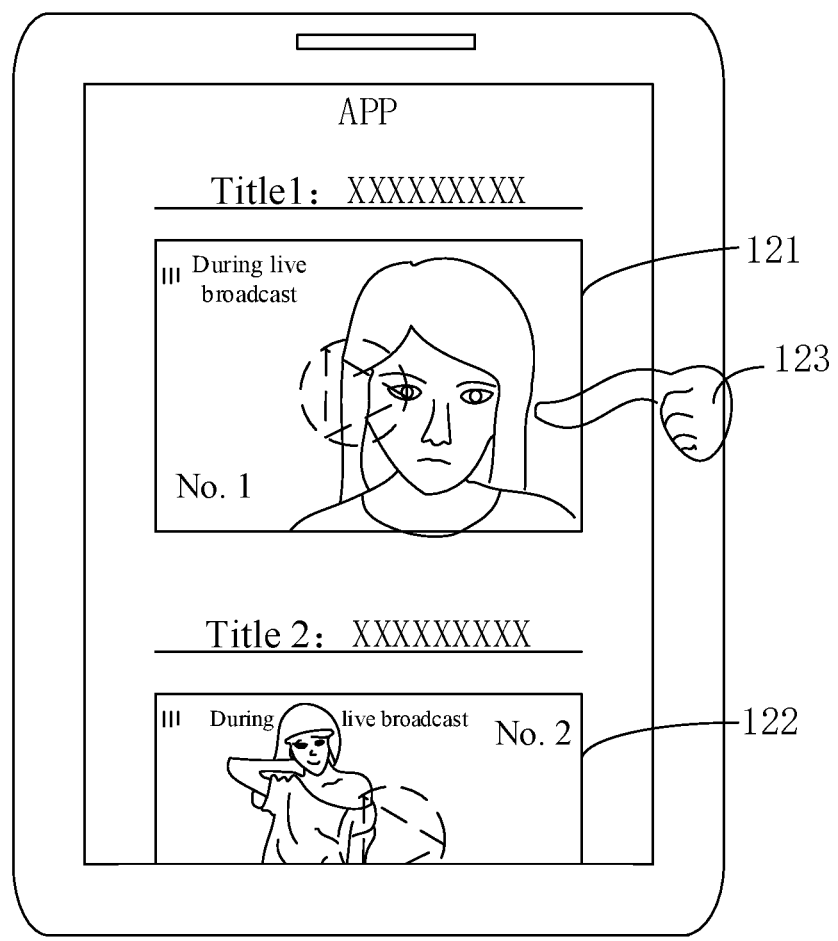

In another possible implementation, as shown in FIG. 12B, when four live broadcast cards enter into the display interface of the APP, the first event happens to all the four live broadcast cards.

In another possible implementation, the first event may be an actual event combined with a condition. For example, the user browses network information through an APP, and the network information includes a plurality of live broadcast cards, wherein live broadcast cards of the first live broadcast room and the second live broadcast room enter into an display interface of the APP, however, if the first live broadcast room has been watched by the user and the second live broadcast room has not been watched by the user, only the first playing frame of the first live broadcast room during a live broadcast process of the first live broadcast room is acquired, but the second broadcast frame of the second live broadcast room during a live broadcast process of the second live broadcast room is not be acquired.

In another possible implementation, the first event may be an actual event combined with another condition. For example, the user browses network information through an APP, and the network information includes a plurality of live broadcast cards, wherein live broadcast cards of the first live broadcast room and the second live broadcast room enter into an display interface of the APP, however, if a broadcast account of the first broadcast room has been followed or collected by the user, and a broadcast account of the second broadcast room has not been followed or collected by the user, only the first playing frame of the first live broadcast room during a live broadcast process of the first live broadcast room is acquired, but the second broadcast frame of the second live broadcast room during a live broadcast process of the second live broadcast room is not acquired.

In response to detecting the first event before receiving the playing instruction for the first live broadcast room, acquiring the first playing frame of the first live broadcast room during a live broadcast process of the first live broadcast room, may include pre-acquiring or preloading live broadcast data before the user issues the playing instruction for the first broadcast room, wherein the first playing frame may be a first video frame of the first broadcast room acquired during the pre-acquiring or preloading the live broadcast data of the first broadcast room.

The first playing frame may be a video frame at any time point of the first live broadcast room during a live broadcast process of the first live broadcast room.

Generating preloaded first kernel data according to the first playing frame, may include, in response to determining that the first playing frame is acquired, generating the first kernel data according to data required for related live broadcast of the first live broadcast room acquired at the same time when the first playing frame is acquired. The first kernel data is used to pull a video stream of the first live broadcast room to play the video stream of the first live broadcast room at a playing end.

After the first kernel data is generated, it can be stored in a designated storage space in advance, and when the playing instruction for the first live broadcast room is received, the video stream of the first live broadcast room is pulled and played according to the first kernel data.

Pulling the live broadcast video stream of the first live broadcast room according to the first kernel data in response to receiving the playing instruction for the first live broadcast room may mean, in response to receiving the playing instruction for the first live broadcast room, continuously pulling the video stream of the first live broadcast room based on the preparation data required for playing the video stream of the first live broadcast room, included in the first kernel data, to achieve normal playing of the live broadcast video stream of the first live broadcast room.

In this embodiment, the first playing frame of the first live broadcast room is acquired before receiving the playing instruction, the process of acquiring the first playing frame of the first live broadcast room is equivalent to the pre-pull operation of the live broadcast video stream of the first live broadcast room. In this embodiment, the first kernel data is generated according to the first playing frame, and the first kernel data can be used for the subsequent playing of the live broadcast video stream, so that after receiving the playing instruction for the live broadcast, the live broadcast video stream can be played directly according to the kernel data, which shortens the loading time after the playing instruction for the live broadcast is issued, reduces the lag at the start of playing the first live broadcast room, and improves the user experience.

In an implementation, the acquiring the first playing frame of the first live broadcast room during a live broadcast process of the first live broadcast room includes:

preloading live broadcast data of a first live broadcast room through a sub-thread until a video frame of the first live broadcast room is preloaded, and taking the video frame of the first live broadcast room loaded during the preloading as the first playing frame.

Preloading the live broadcast data of the first live broadcast room through the sub-thread, may include, preloading all the data required for the preparation of the start of playing the first live broadcast room until the video frame of the first live broadcast room is loaded, and it is determined that the preloading operation of the first live broadcast room can be ended.

In this embodiment, the step of preloading operation can be the same as the step of loading operation performed after the user clicks on a live broadcast card of a live broadcast room, but in this embodiment, the live broadcast data of the first live broadcast room is preloaded without receiving the playing instruction for the first live broadcast room.

In this embodiment, the live broadcast data may include not only live broadcast video data, but also other data required for playing the live broadcast video data of the live broadcast room at the playing end, such as information on a protocol and a data format.

In a possible implementation, the first playing frame may or may not be updated according to a certain time interval.

In this embodiment, the live broadcast data of the first live broadcast room is preloaded through the sub-thread, so that the normal operations such as using network tools and browsing network data by the user will not be interfered. The preloading operation is performed until any video frame of the first live broadcast room is preloaded, so that an extra burden will not be generated on the playing end due to excessive preloaded data.

In another possible implementation, the preloaded data of the first live broadcast room can be played.

In an implementation, generating preloaded first kernel data according to the first playing frame, includes:

acquiring a transparent transmission protocol and a data format of the first live broadcast room;

generating a decoder for decoding a received video stream of the first live broadcast room according to the transparent transmission protocol and the data format of the first live broadcast room, and a data format of a playing end; and generating the preloaded first kernel data according to the decoder and data of the first live broadcast room that has been acquired when the first playing frame is preloaded.

Acquiring the transparent transmission protocol and the data format of the first live broadcast room may include acquiring the transparent transmission protocol of the first live broadcast room and the data format of the first live broadcast room.

A decoder can be used to convert the data format of the video of the first live broadcast room into the data format of the playing end, so that the playing end can play the live broadcast video data.

In this embodiment, the preloaded first kernel data is generated according to the decoder and the data of the first live broadcast room that has been acquired when the first broadcast frame is preloaded, so that after the playing instruction for the first live broadcast room is received, the video of the first live broadcast room can be played directly according to the first kernel data, thereby reducing the loading time after the user issues the playing instruction for the first live broadcast room and improving the user experience.

In an implementation, pulling a live broadcast video stream of the first live broadcast room according to the first kernel data, includes:

acquiring an original video stream of the first live broadcast room according to the transparent transmission protocol of the first live broadcast room; and decoding the original video stream using the decoder, to obtain the live broadcast video stream of the first live broadcast room.

In this embodiment, the decoder used to decode the original video stream of the first live broadcast room is a pre-generated decoder, which can shorten the time from when the user issues the playing instruction for the first live broadcast room to when the user sees the live broadcast picture, and improve the user experience.

In an implementation, the first event includes appearance of a live broadcast card of the first live broadcast room in a set display range of a playing end.

In a possible implementation, the live broadcast card appears in the set display range of the playing end. Specifically, the user can browse the network data by sliding, so that the live broadcast card appears in the display range of the playing end. Alternatively, the live broadcast card appears in the display range of the playing end by means of automatic pop-up or the like.

In another possible implementation, the first event can be a user-defined event, for example, reaching a set time point, etc.

In the case that a live broadcast card of the first live broadcast room appears in a set display range of a playing end, the video frame of the first live broadcast room is acquired, so that the video of the first live broadcast room can be quickly played after the user issues the playing instruction for the first live broadcast room, and the user experience is improved.

Figure 2:
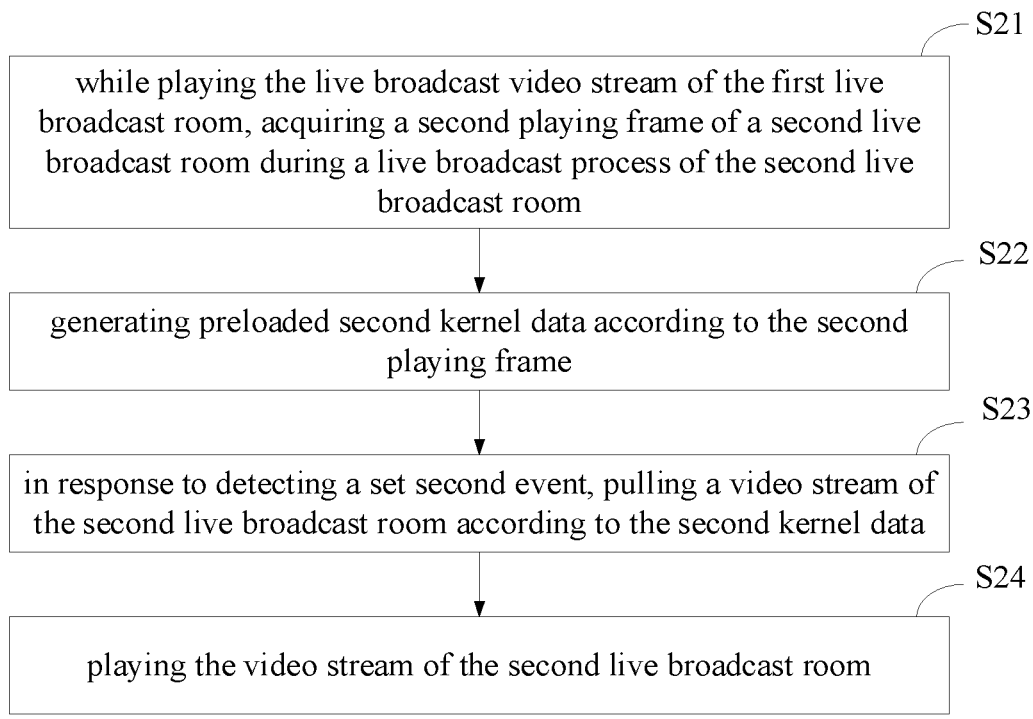
FIG. 2 is a schematic flowchart of a method for processing live broadcast information according to another embodiment of the present disclosure.

In an implementation, as shown in FIG. 2, the method for processing live broadcast information further includes:

S21, while playing the live broadcast video stream of the first live broadcast room, acquiring a second playing frame of a second live broadcast room during a live broadcast process of the second live broadcast room;

S22, generating preloaded second kernel data according to the second playing frame;

S23, in response to detecting a set second event, pulling a video stream of the second live broadcast room according to the second kernel data; and S24, playing the video stream of the second live broadcast room.

In a specific implementation, the second live broadcast room may be a live broadcast room related to the first live broadcast room. For example, the second live broadcast room may be an adjacent live broadcast room of the first live broadcast room, to which the first live broadcast room can be switched by means of sliding switching while the live broadcast video stream of the first live broadcast room is being played.

In this embodiment, the live broadcast data of the second live broadcast room can be preloaded while the live broadcast video stream of the first live broadcast room is being played, so that it is convenient to quickly play the live broadcast video stream of the second live broadcast room when the user issues the playing instruction for the second live broadcast room, thus improving the user experience.

In an implementation, the set second event includes: switching from the first live broadcast room to the second live broadcast room.

In a specific implementation, switching from the first live broadcast room to the second live broadcast room can be done by any means.

For example, switching between the live broadcast rooms can be done by a preset operation of sliding up and down or sliding left and right.

Figure 13A:
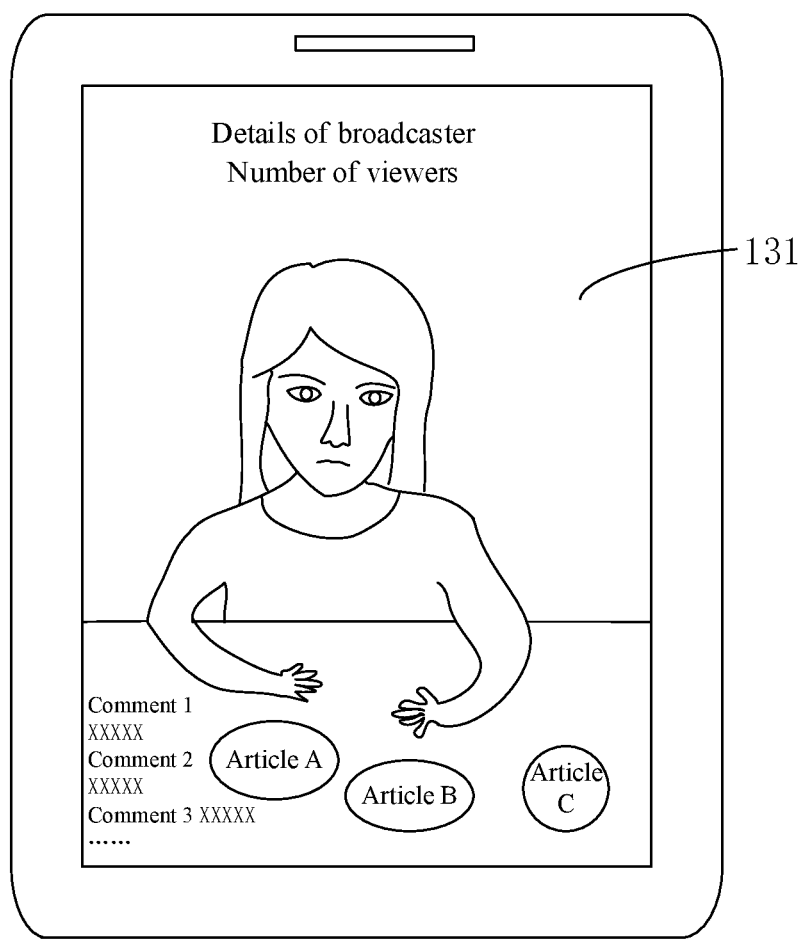
FIG. 13A is a schematic diagram of a live broadcast process according to another example of the present disclosure.
Figure 13B:
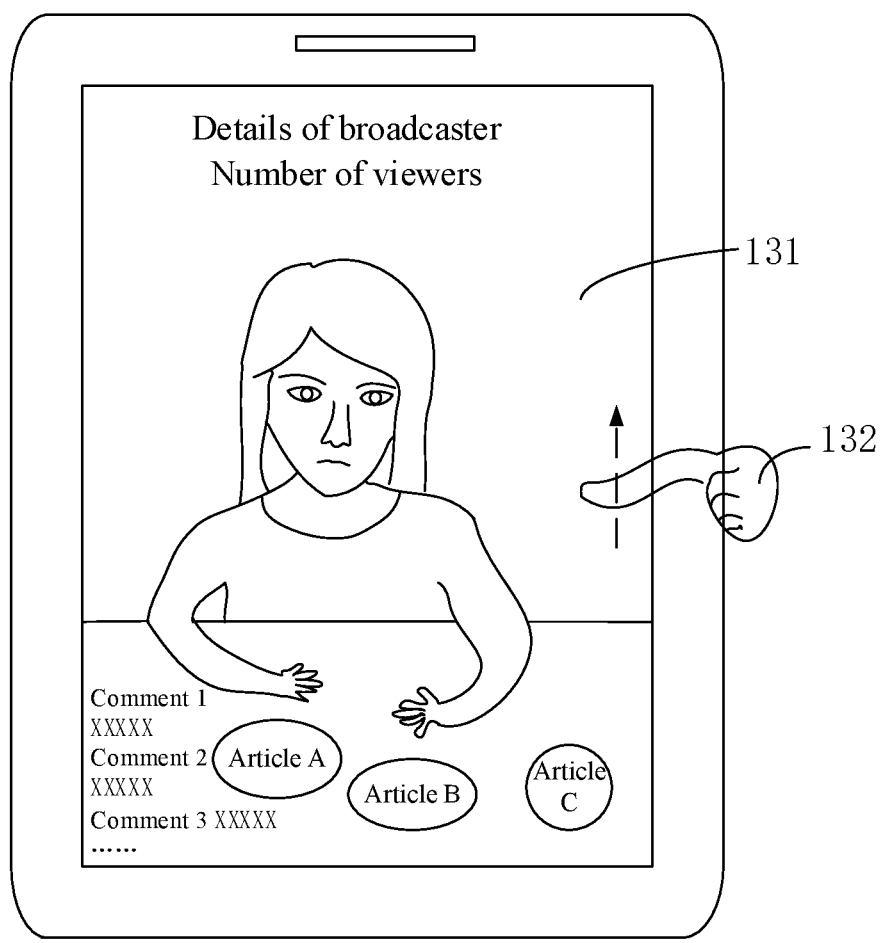
FIG. 13B is a schematic diagram of switching through sliding by a user during a live broadcast according to another example of the present disclosure.

In a specific implementation, the second event may be an event occurring during the process of playing the live broadcast video stream of the first live broadcast room, such as the live broadcast process of the first live broadcast room 131 shown in FIG. 13A. As shown in FIG. 13B, the second event may be an event that the user's finger 132 slides on the screen.

In another possible implementation, switching between the live broadcast rooms can also be done through a set switch button.

In this embodiment, in the case that the second event occurs, the preloaded data can be used to facilitate switching from the first live broadcast room to the second live broadcast room, thereby ensuring smooth video playing, reducing lag and improving user experience during switching.

Figure 3:
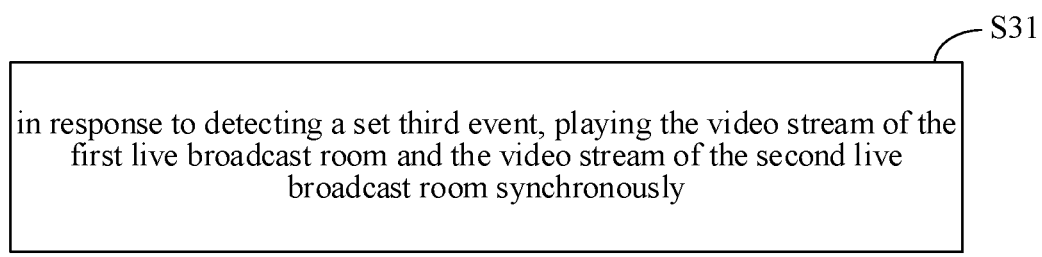
FIG. 3 is a schematic flowchart of a method for processing live broadcast information according to yet another embodiment of the present disclosure.

In an implementation, as shown in FIG. 3, the method for processing live broadcast information further includes:

S31, in response to detecting a set third event, playing the video stream of the first live broadcast room and the video stream of the second live broadcast room synchronously.

In a specific implementation, the third event may be a custom event.

In an embodiment of the present disclosure, when being played synchronously, voice playing of one of the live broadcast rooms can be muted according to the setting, alternatively, live broadcast audio streams of two live broadcast rooms can be played at the same time.

In this embodiment, when the third event is detected, the video streams of the first live broadcast room and the second live broadcast room can be played synchronously, so that the user experience can be further improved.

Figure 14:
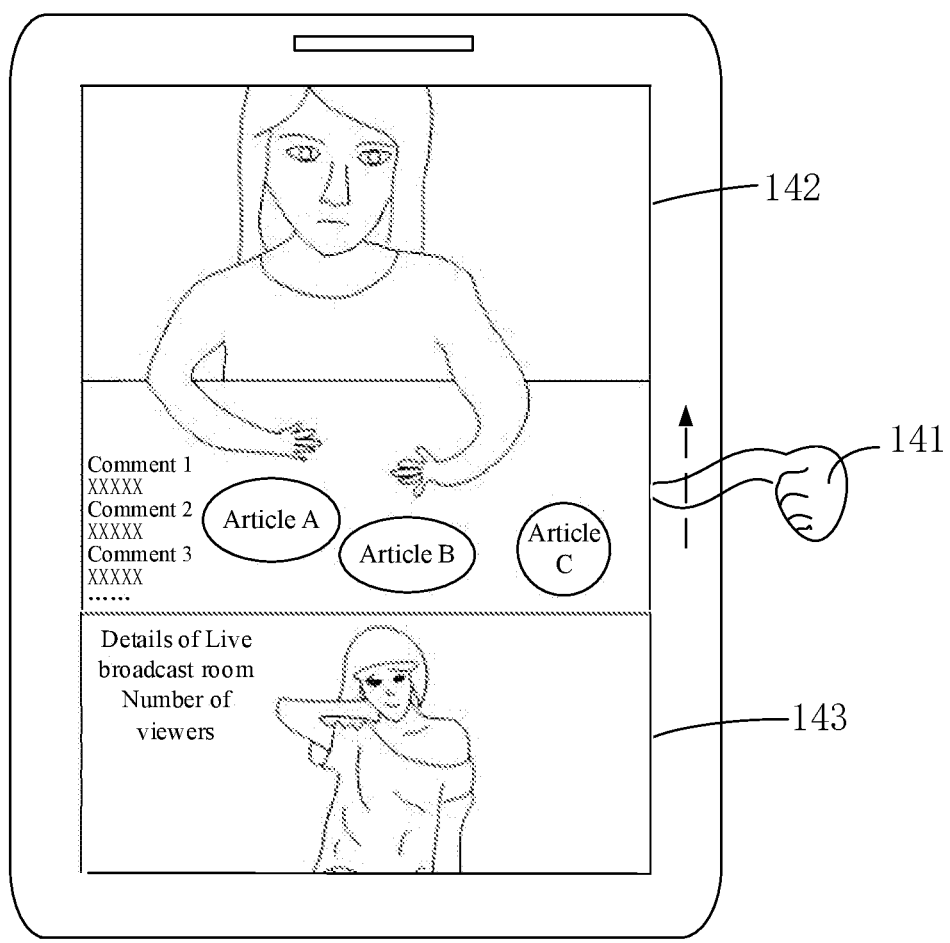
FIG. 14 is a schematic diagram of a second event according to another example of the present disclosure.

In an implementation, the set third event includes simultaneous appearance of a window corresponding to the first live broadcast room and a window corresponding to the second live broadcast room on a playing interface of a live broadcast playing end. As shown in FIG. 14, when the user's finger 141 slides the first live broadcast room 142, the switching operation of the first live broadcast room 142 is performed, and a picture of the first live broadcast room 142 begins to disappear from the display interface, and a picture of the second live broadcast room 143 begins to appear from the display interface. During this process, the display interface may present a part of the picture of the first live broadcast room 142 and a part of the picture of the second live broadcast room 143 at the same time. In this case, the live broadcast video streams of the first live broadcast room 142 and the second live broadcast room 143 can be played simultaneously.

In this embodiment, the windows of the first live broadcast room and the second live broadcast room that appear at the same time can be the same window or different windows.

During the process of switching between live broadcast rooms by sliding, the window of the first live broadcast room and the window of the second live broadcast room may appear at the live broadcast playing end simultaneously. In this case, the video data of the two live broadcast rooms are played at the same time, so that the user cannot visually feel the video loading process of the live broadcast rooms, and the user experience is improved.

In an example of the present disclosure, the playing end can predefine a protocol for the live broadcast, and the Scheme (live broadcast address) to be played by the playing end is generated through the predefined protocol. The live broadcast Scheme specifically can be: demoApp://live/enter?params={"screen":"1","play_url":"http://flv.live.lss-user.bai.com/live/stream_bduid_20085969-L1.flv", "roomId":"3345678"}.

The predefined protocol can support vertical screen playing and horizontal screen playing of the playing end, acquisition of the playing address of the live broadcast room, and identification of the identity (ID) of the live broadcast room.

The playing end can be a mobile phone, a desktop computer, a notebook computer, a tablet computer, etc. The playing tool of the playing end can be an APP, a browser, etc., and a dependency framework need to be firstly imported into the playing tool of the playing end. For example, an open source framework for the IJKMediaFramework dependency framework can be adopted, which can include a dependency library.

After introducing the relevant framework, the playing end needs to add the header file path. For example, for the IJKMediaFramework dependent framework, the path of IJKMediaFramework can be added in Build Settings->Header Search Paths, and the functions invoking the dependent framework (such as functions -fobjc-arc and -ObjC) can be added in Other Linker Flags of Build Settings.

In a possible implementation, Bitcode can also be disabled and the automatic cropping function can be turned off as needed. Some privacy settings also can be configured.

In the example of the present disclosure, some modifications can be made to the IJKMediaFramework, so that it can achieve the function such as preloading of the present disclosure. When the dependent framework is invoked for pre-playing, a decoder is created, until the first frame is pulled.

In a possible implementation, when the user browses the main interface, in the case that a live broadcast card including the protocol appears in the screen of the playing end, a sub-thread is started for preloading data until any video frame of a live broadcast room corresponding to the live broadcast card is preloaded, and kernel data is created according to the preloaded data.

When the user manually clicks to enter the live broadcast page, the live broadcast is created directly, the player is created, and the preloaded kernel data is acquired and played.

The details data of the live broadcast room corresponding to the live broadcast card is pulled, and the list data of the live broadcast room is pulled for rendering, so as to achieve the video playing of the live broadcast room corresponding to the live broadcast card.

In another example, the user starts playing of the current live broadcast room, and after the first frame of the current live broadcast room is rendered successfully, the data of the next live broadcast room will be preloaded.

When the user wants to switch to a live broadcast room, the player component of the live broadcast room starts to be created, the kernel preloaded just now is acquired, and the live broadcast room corresponding to the switching target can be played in a mute playing mode.

When the user finishes sliding, the live broadcast room corresponding to the switching target is played non-mutely, and the first frame of the live broadcast room corresponding to the switching target has been rendered successfully, and the data of the next live broadcast room of the live broadcast room corresponding to the switching target is preloaded again.

According to the scheme provided by the embodiment of the present disclosure, the start speed of playing the live broadcast room can be improved, and playing can be effectively supported during sliding by the user. No lagging, no loading.

Figure 4:
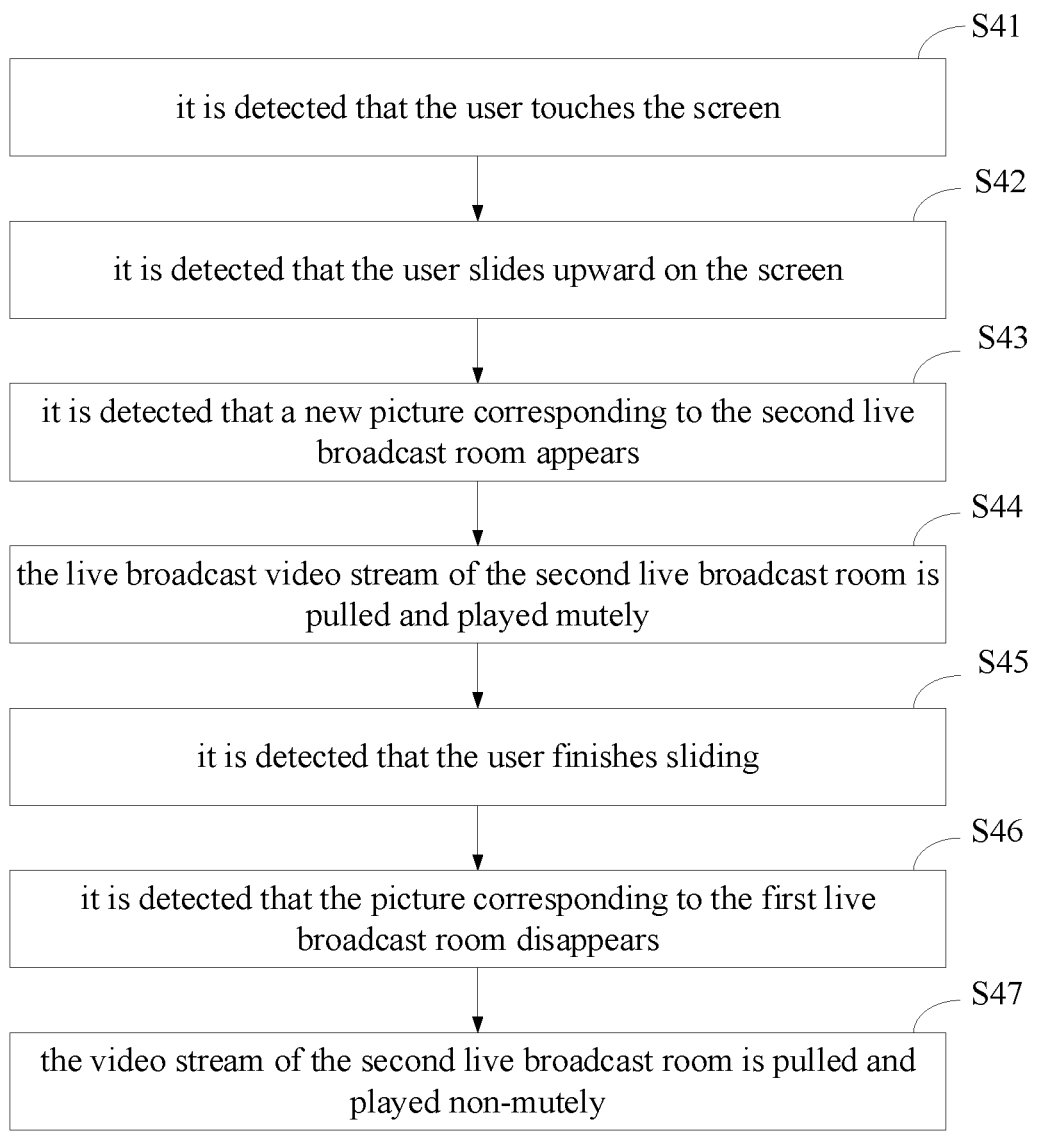
FIG. 4 is a schematic flowchart of a method for processing live broadcast information according to an example of the present disclosure.

In an example of the present disclosure, as shown in FIG. 4, the method for processing live broadcast information includes the following steps during the playing process of the first live broadcast room.

S41: it is detected that the user touches the screen.

S42: it is detected that the user slides upward on the screen.

S43: it is detected that a new picture corresponding to the second live broadcast room appears.

S44: the live broadcast video stream of the second live broadcast room is pulled and played mutely.

S45: it is detected that the user finishes sliding.

S46: it is detected that the picture corresponding to the first live broadcast room disappears.

S47: the video stream of the second live broadcast room is pulled and played non-mutely.

Figure 5:
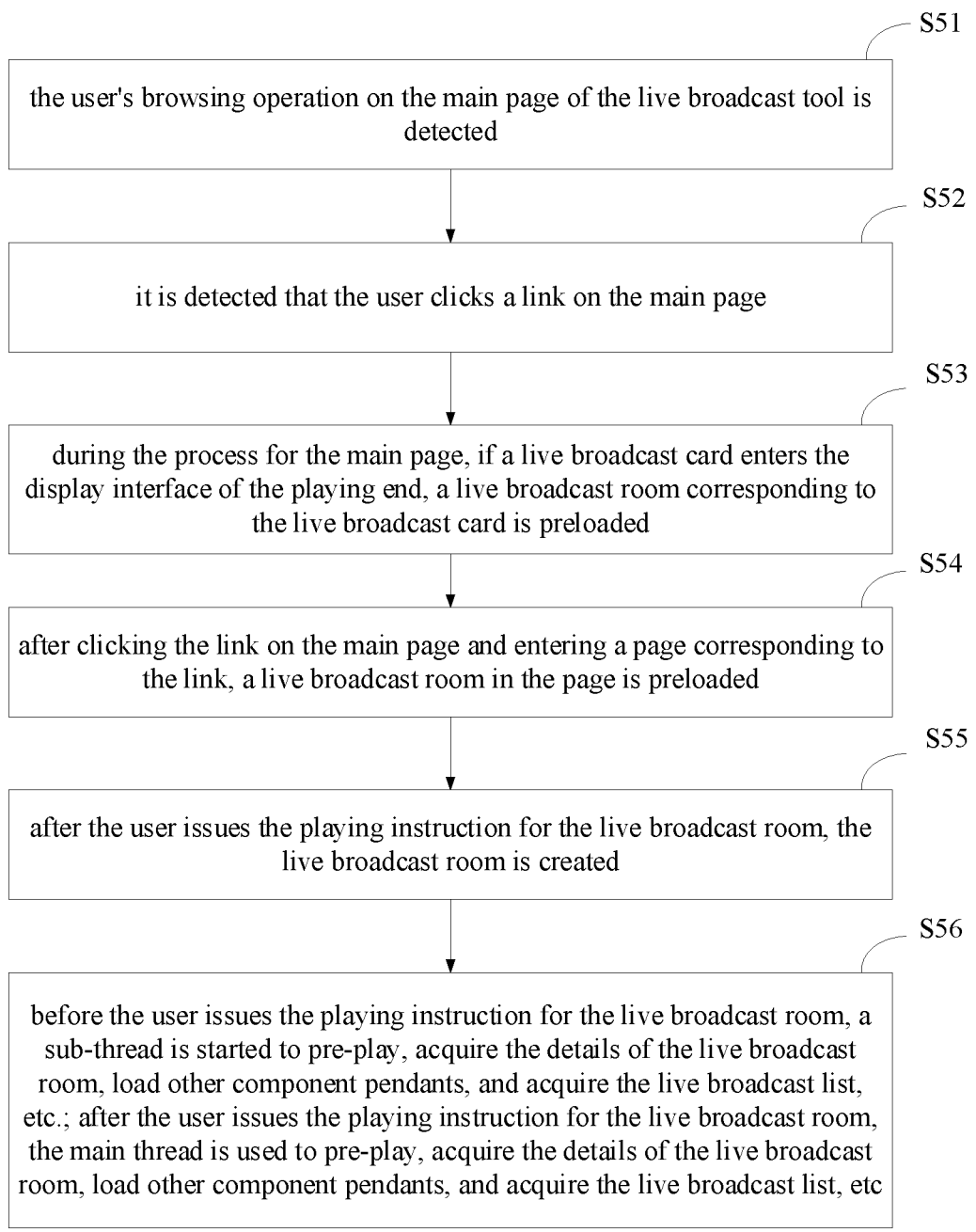
FIG. 5 is a schematic flowchart of a method for processing live broadcast information according to another example of the present disclosure.

In another example of the present disclosure, the method includes a process as shown in FIG. 5.

S51: the user's browsing operation on the main page of the live broadcast tool is detected, wherein the main page of the live broadcast tool follows a relevant protocol.

S52: it is detected that the user clicks a link on the main page.

S53: during the process for the main page, if a live broadcast card enters the display interface of the playing end, a live broadcast room corresponding to the live broadcast card is preloaded.

S54: after clicking the link on the main page and entering a page corresponding to the link, a live broadcast room in the page is preloaded.

S55: after the user issues the playing instruction for the live broadcast room, the live broadcast room is created.

S56: before the user issues the playing instruction for the live broadcast room, a sub-thread is started to pre-play, acquire the details of the live broadcast room, load other component pendants, and acquire the live broadcast list, etc. After the user issues the playing instruction for the live broadcast room, the main thread is used to pre-play, acquire the details of the live broadcast room, load other component pendants, and acquire the live broadcast list, etc.

Figure 6:
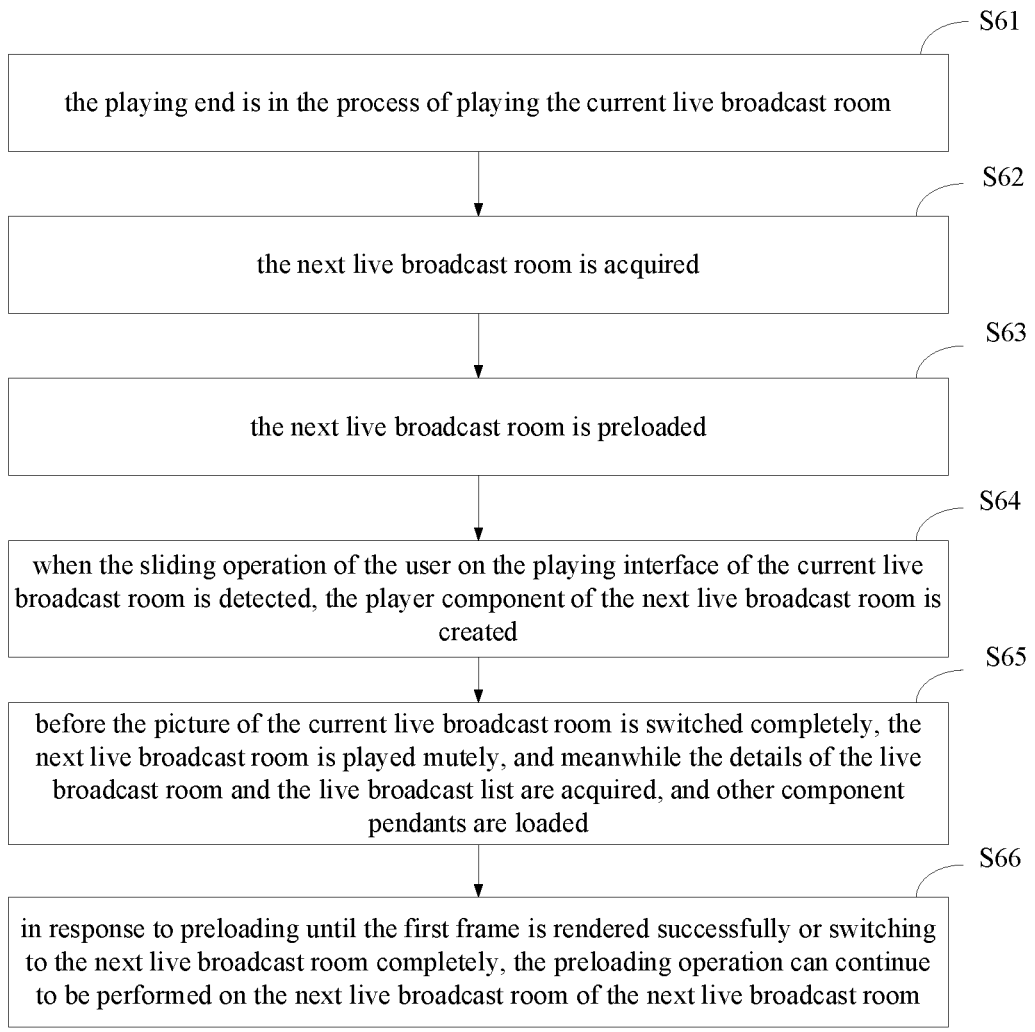
FIG. 6 is a schematic flowchart of a method for processing live broadcast information according to another example of the present disclosure.

In an example of the present disclosure, the method includes a process as shown in FIG. 6.

S61: the playing end is in the process of playing the current live broadcast room (the first frame is played successfully).

S62: the next live broadcast room is acquired.

S63: the next live broadcast room is preloaded.

S64: when the sliding operation of the user on the playing interface of the current live broadcast room is detected, the player component of the next live broadcast room is created.

S65: before the picture of the current live broadcast room is switched completely, the next live broadcast room is played mutely, and meanwhile the details of the live broadcast room and the live broadcast list are acquired, and other component pendants are loaded.

S66: in response to preloading until the first frame is rendered successfully or switching to the next live broadcast room completely, the preloading operation can continue to be performed on the next live broadcast room of the next live broadcast room.

Figure 7:
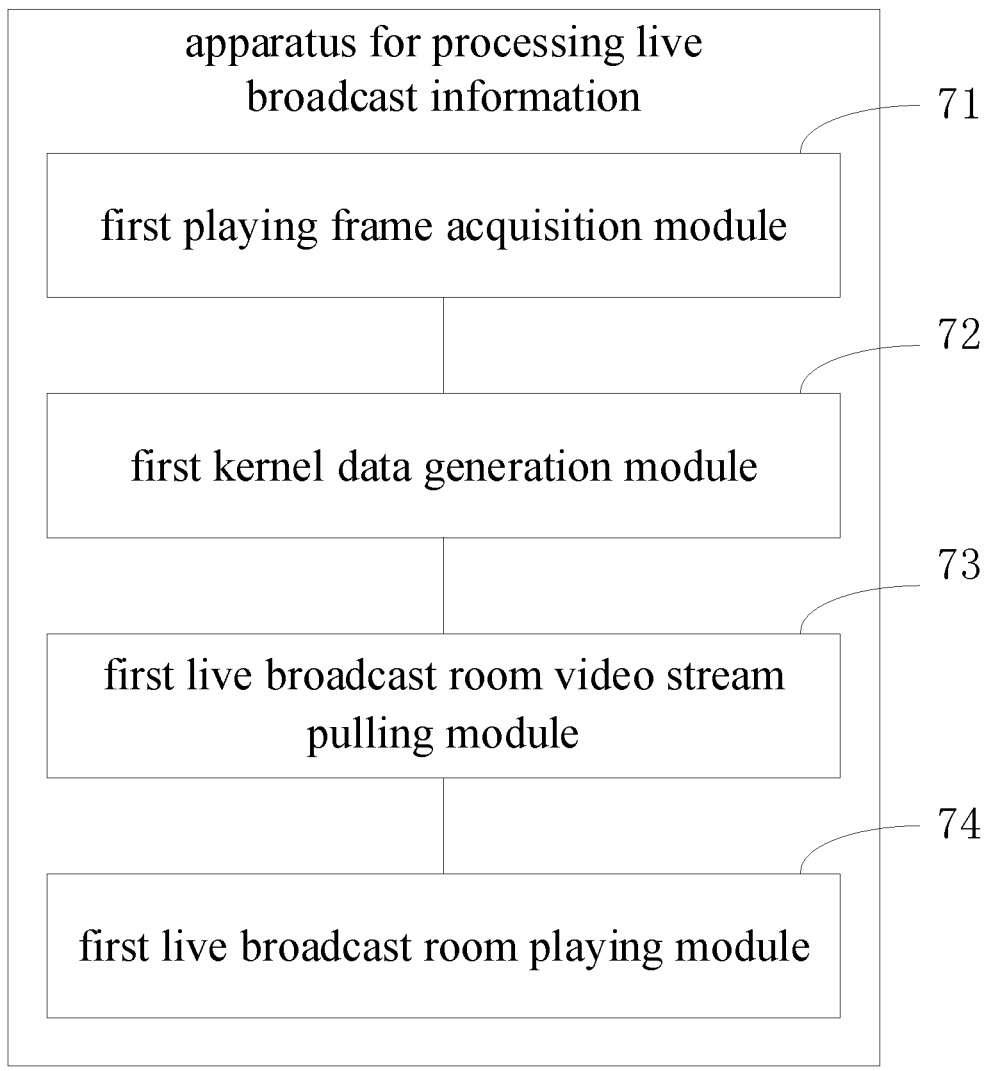
FIG. 7 is a schematic flowchart of an apparatus for processing live broadcast information according to an embodiment of the present disclosure.

An embodiment of the present disclosure also provides an apparatus for processing live broadcast information, as shown in FIG. 7, including:

a first playing frame acquisition module 71 configured for, in response to detecting a first event before receiving a playing instruction for a first live broadcast room, acquiring a first playing frame of the first live broadcast room during a live broadcast process of the first live broadcast room;

a first kernel data generation module 72 configured for generating preloaded first kernel data according to the first playing frame;

a first live broadcast room video stream pulling module 73 configured for, in response to receiving the playing instruction for the first live broadcast room, pulling a live broadcast video stream of the first live broadcast room according to the first kernel data; and a first live broadcast room playing module 74 configured for playing the live broadcast video stream of the first live broadcast room.

In an implementation, the first playing frame acquiring module is further configured for:

preloading live broadcast data of a first live broadcast room through a sub-thread until a video frame of the first live broadcast room is preloaded, and taking the video frame of the first live broadcast room loaded during the preloading as a first playing frame.

Figure 8:
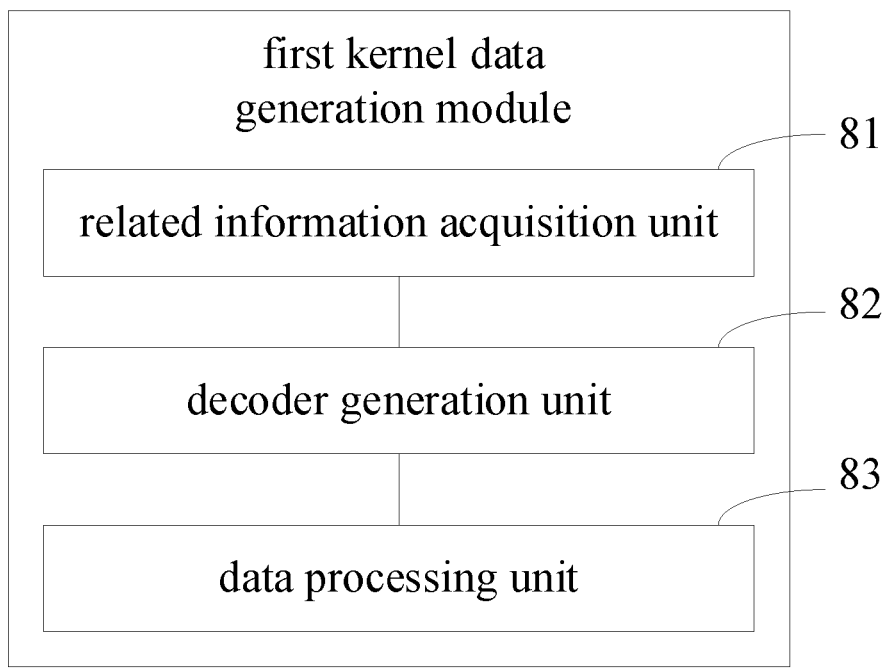
FIG. 8 is a schematic flowchart of an apparatus for processing live broadcast information according to another embodiment of the present disclosure.

In an implementation, as shown in FIG. 8, the first kernel data generation module includes:

a related information acquisition unit 81 configured for acquiring a transparent transmission protocol and a data format of the first live broadcast room;

a decoder generation unit 82 configured for generating a decoder for decoding a received video stream of the first live broadcast room according to the transparent transmission protocol and the data format of the first live broadcast room, and a data format of a playing end; and a data processing unit 83 configured for generating the preloaded first kernel data according to the decoder and data of the first live broadcast room that has been acquired when the first playing frame is preloaded.

Figure 9:
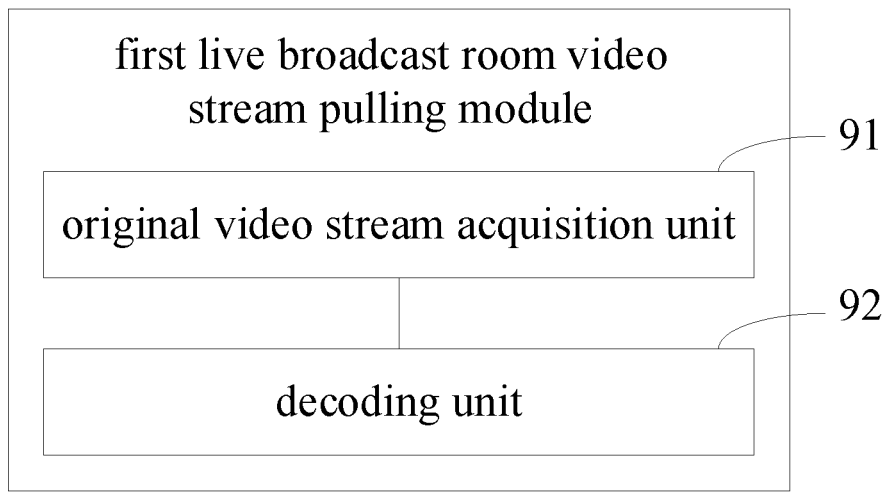
FIG. 9 is a schematic flowchart of an apparatus for processing live broadcast information according to yet another embodiment of the present disclosure.

In an implementation, as shown in FIG. 9, the first live broadcast room video stream pulling module includes:

an original video stream acquisition unit 91 configured for acquiring an original video stream of the first live broadcast room according to the transparent transmission protocol of the first live broadcast room; and a decoding unit 92 configured for decoding the original video stream using the decoder, to obtain the live broadcast video stream of the first live broadcast room.

In an implementation, the first event includes appearance of a live broadcast card of the first live broadcast room in a set display range of a playing end.

Figure 10:
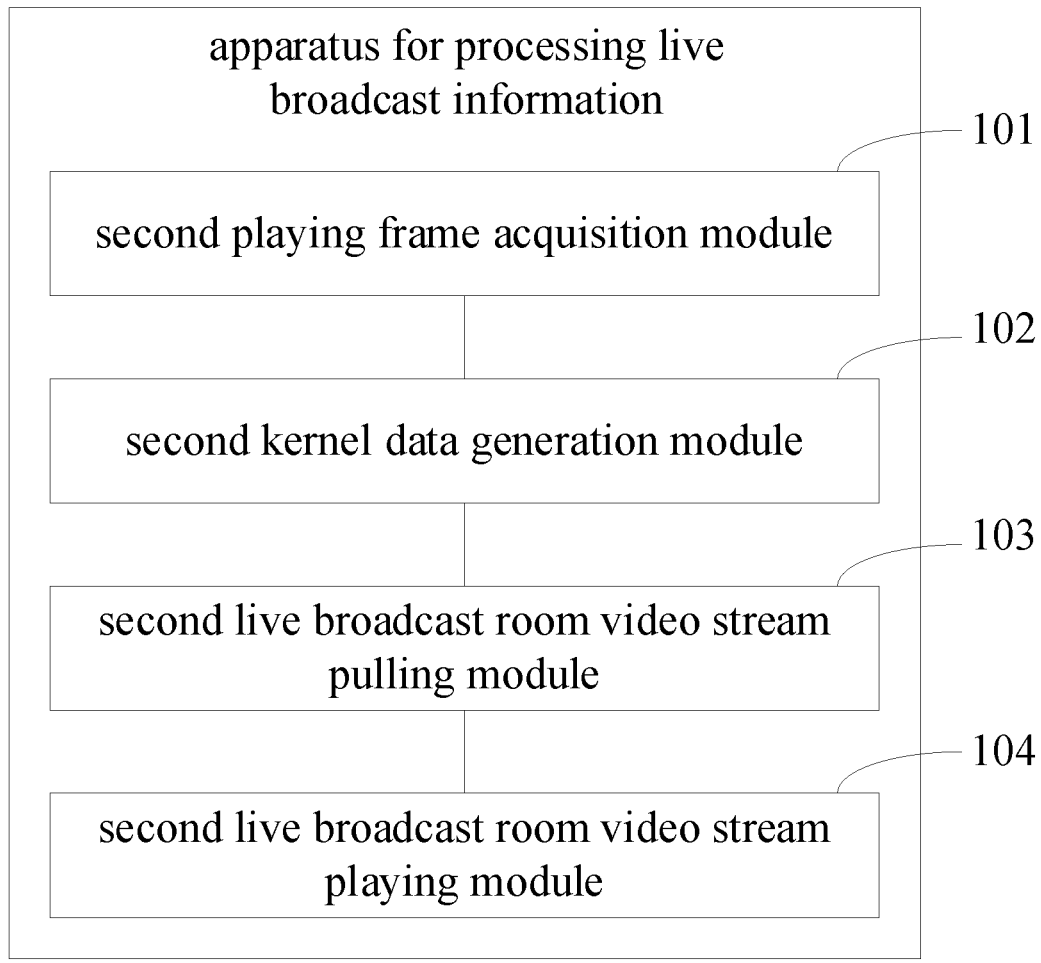
FIG. 10 is a schematic flowchart of an apparatus for processing live broadcast information according to yet another embodiment of the present disclosure.

In an implementation, as shown in FIG. 10, the apparatus for processing live broadcast information further includes:

a second playing frame acquisition module 101 configured for, while playing the live broadcast video stream of the first live broadcast room, acquiring a second playing frame of a second live broadcast room during a live broadcast process of the second live broadcast room;

a second kernel data generation module 102 configured for generating preloaded second kernel data according to the second playing frame;

a second live broadcast room video stream pulling module 103 configured for, in response to detecting a set second event, pulling a video stream of the second live broadcast room according to the second kernel data; and a second live broadcast room video stream playing module 104 configured for playing the video stream of the second live broadcast room.

In an implementation, the set second event includes switching from the first live broadcast room to the second live broadcast room.

Figure 11:
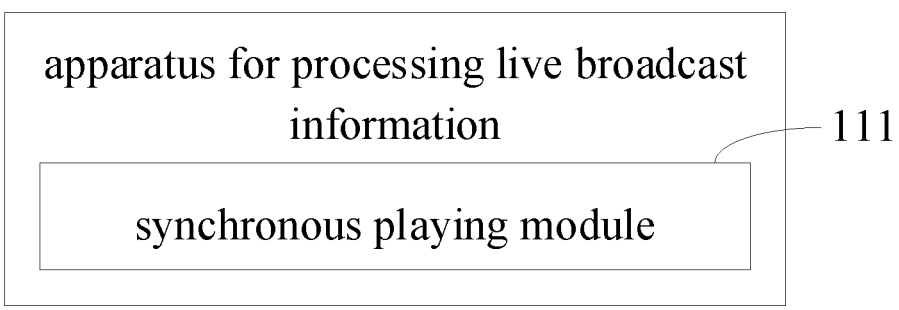
FIG. 11 is a schematic flowchart of an apparatus for processing live broadcast information according to yet another embodiment of the present disclosure.

In an implementation, as shown in FIG. 11, the apparatus for processing live broadcast information further includes:

a synchronous playing module 111 configured for, in response to detecting a set third event, playing the video stream of the first live broadcast room and the video stream of the second live broadcast room synchronously.

In an implementation, the set third event includes simultaneous appearance of a window corresponding to the first live broadcast room and a window corresponding to the second live broadcast room on a playing interface of a live broadcast playing end.

The functions of each unit, module or sub-module in each apparatus in the embodiments of the present disclosure can be referred to the corresponding descriptions in the above method embodiments, and will not be repeated here.

According to an embodiment of the present disclosure, the present disclosure also provides an electronic device, a readable storage medium and a computer program product.

Figure 15:
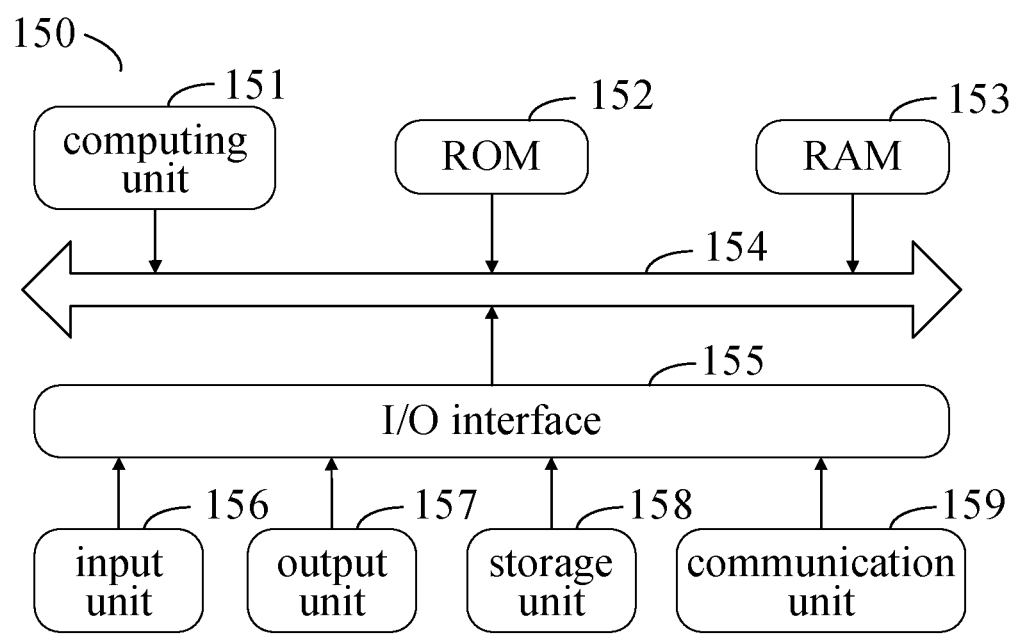
FIG. 15 is a block diagram of an electronic device for implementing the method for processing live broadcast information according to an embodiment of the present disclosure.

FIG. 15 shows a schematic block diagram of an example electronic device 150 that can be used to implement embodiments of the present disclosure. Electronic devices are intended to represent various forms of digital computers, such as laptop computers, desktop computers, workbench, personal digital assistants, servers, blade servers, mainframe computers, and other suitable computers. Electronic devices can also represent various forms of mobile apparatus, such as personal digital processing, cellular phones, smart phones, wearable devices and other similar computing devices. The components shown herein, their connections and relationships, and their functions are merely examples, and are not intended to limit the implementation of the disclosure described and/or claimed herein.

As shown in FIG. 15, the electronic device 150 includes a computing unit 151, which can perform various appropriate actions and processes according to a computer program stored in a read only memory (ROM) 152 or a computer program loaded from a storage unit 158 into a random access memory (RAM) 153. In the RAM 153, various programs and data required for the operation of the electronic device 150 can also be stored. A computing unit 151, a ROM 152, and a RAM 153 are connected to each other through a bus 154. Input/output (I/O) interface 155 is also connected to bus 154.

A plurality of components in the electronic device 150 are connected to the I/O interface 155, including: an input unit 156, such as a keyboard, a mouse, and the like; an output unit 157, such as various types of displays and speakers; a storage unit 158, such as a magnetic disk, an optical disk, etc.; and a communication unit 159, such as a network card, a modem, a wireless communication transceiver, etc. The communication unit 159 allows the electronic device 150 to exchange information/data with other devices through a computer network such as the Internet and/or various telecommunication networks.

The computing unit 151 may be various general-purpose and/or special-purpose processing components with processing and computing capabilities. Some examples of the computing unit 151 include, but are not limited to, a central processing unit (CPU), a graphics processing unit (GPU), various dedicated artificial intelligence (AI) computing chips, various computing units running machine learning model algorithms, a digital signal processor (DSP), and any appropriate processor, controller, microcontroller, etc. The computing unit 151 performs various methods and processes described above, for example a broadcast information processing method. For example, in some embodiments, the broadcast information processing method may be implemented as a computer software program tangibly included in a machine-readable medium, for example a storage unit 158. In some embodiments, part or all of the computer program may be loaded and/or installed on the electronic device 150 via the ROM 152 and/or the communication unit 159. When the computer program is loaded into the RAM 153 and executed by the computing unit 151, one or more steps of the broadcast information processing method described above may be executed. Alternatively, in other embodiments, the computing unit 151 may be configured to execute the broadcast information processing method by any other appropriate means (for example, by means of firmware).

The various implementations of the systems and techniques described above herein may be implemented in digital electronic circuit systems, integrated circuit systems, field programmable gate arrays (FPGA), application specific integrated circuits (ASIC), application specific standard products (ASSP), systems on a chip (SOC), load programmable logic devices (CPLD), computer hardware, firmware, software, and/or combinations thereof. These various implementations may include an implementation in one or more computer programs, which can be executed and/or interpreted on a programmable system including at least one programmable processor; the programmable processor may be a dedicated or general-purpose programmable processor and capable of receiving and transmitting data and instructions from and to a storage system, at least one input device, and at least one output device.

Program code for implementing the method of the present disclosure may be written in any combination of one or more programming languages. These program codes may be provided to a processor or controller of a general purpose computer, a special purpose computer, or other programmable data processing apparatus, such that the program codes, when executed by the processor or controller, cause the functions/operations specified in the flowcharts and/or block diagrams to be implemented. The program code can be executed completely on the machine, partially on the machine, partially on the machine as an independent software package and partially on a remote machine or completely on a remote machine or server.

In the context of the present disclosure, a machine-readable medium may be a tangible medium that may include or store a program for use by or in connection with an instruction execution system, apparatus or device. The machine-readable medium may be a machine-readable signal medium or a machine-readable storage medium. The machine-readable medium may include, but is not limited to, electronic, magnetic, optical, electromagnetic, infrared, or semiconductor systems, apparatuses, or devices, or any suitable combination of the above. More specific examples of the machine-readable storage medium may include one or more wire-based electrical connections, portable computer disks, hard disks, random access memory (RAM), read-only memory (ROM), erasable programmable read-only memory (EPROM or flash memory), optical fibers, compact disc read-only memory (CD-ROM), optical storage devices, magnetic storage devices, or any suitable combination of the above.

In order to provide an interaction with a user, the system and technology described here may be implemented on a computer having: a display device (e. g., a cathode ray tube (CRT) or a liquid crystal display (LCD) monitor) for displaying information to the user; and a keyboard and a pointing device (e. g., a mouse or a trackball), through which the user can provide an input to the computer. Other kinds of devices can also provide an interaction with the user. For example, a feedback provided to the user may be any form of sensory feedback (e.g., visual feedback, auditory feedback, or tactile feedback); and an input from the user may be received in any form, including an acoustic input, a voice input or a tactile input.

The systems and technologies described here can be implemented in a computing system including background components (e.g., as a data server), a computing system including middleware components (e.g., an application server), or a computing system including front-end components (e.g., a user computer with a graphical user interface or a web browser through which users can interact with implementations of the systems and technologies described here), or a computing system including any combination of such back-end components, middleware components, or front-end components. Components of the system can be connected to each other through digital data communication in any form or medium (e.g., communication network). Examples of communication networks include local area networks (LANs), wide area networks (WANs), and the Internet.

A computer system may include a client and a server. Clients and servers are generally remote from each other and usually interact through communication networks. The relationship between client and server is created by computer programs running on corresponding computers and having a client-server relationship with each other.

It should be understood that steps can be reordered, added or deleted using the various forms of flow shown above. For example, the various steps described in the present disclosure can be executed in parallel, sequentially or in a different order, as long as the desired results of the technical solutions disclosed in the present disclosure can be achieved, there is no limitation here.

The above specific implementations do not limit the protection scope of the present disclosure. It should be understood by those skilled during the process art that various modifications, combinations, sub-combinations and substitutions can be made according to design requirements and other factors. Any modification, equivalent replacement and improvement made within the spirit and principle of the present disclosure shall be included in the protection scope of the present disclosure.

What is claimed is:

1. A method for processing live broadcast information, comprising:
   in response to detecting a first event before receiving a playing instruction for a first live broadcast room, acquiring a first playing frame of the first live broadcast room during a live broadcast process of the first live broadcast room;
   generating preloaded first kernel data according to the first playing frame;
   in response to receiving the playing instruction for the first live broadcast room, pulling a live broadcast video stream of the first live broadcast room according to the first kernel data; and
   playing the live broadcast video stream of the first live broadcast room,
   wherein the acquiring a first playing frame of the first live broadcast room during a live broadcast process of the first live broadcast room comprises:
   preloading live broadcast data of the first live broadcast room through a sub-thread until a video frame of the first live broadcast room is preloaded, and taking the video frame of the first live broadcast room loaded during the preloading as the first playing frame,
   wherein the generating preloaded first kernel data according to the first playing frame comprises:
   acquiring a transparent transmission protocol and a data format of the first live broadcast room;
   generating a decoder for decoding a received video stream of the first live broadcast room according to the transparent transmission protocol and the data format of the first live broadcast room, and a data format of a playing end; and
   generating the preloaded first kernel data according to the decoder and data of the first live broadcast room that has been acquired when the first playing frame is preloaded.

2. The method of claim 1, wherein the pulling a live broadcast video stream of the first live broadcast room according to the first kernel data comprises:

acquiring an original video stream of the first live broadcast room according to the transparent transmission protocol of the first live broadcast room; and decoding the original video stream using the decoder, to obtain the live broadcast video stream of the first live broadcast room.

3. The method of claim 1, wherein the first event comprises appearance of a live broadcast card of the first live broadcast room in a set display range of a playing end.

4. The method of claim 1, further comprising:

while playing the live broadcast video stream of the first live broadcast room, acquiring a second playing frame of a second live broadcast room during a live broadcast process of the second live broadcast room;

generating preloaded second kernel data according to the second playing frame;

in response to detecting a set second event, pulling a video stream of the second live broadcast room according to the second kernel data; and playing the video stream of the second live broadcast room.

5. The method of claim 4, wherein the set second event comprises switching from the first live broadcast room to the second live broadcast room.

6. The method of claim 4, further comprising:

in response to detecting a set third event, playing the video stream of the first live broadcast room and the video stream of the second live broadcast room synchronously.

7. The method of claim 6, wherein the set third event comprises simultaneous appearance of a window corresponding to the first live broadcast room and a window corresponding to the second live broadcast room on a playing interface of a live broadcast playing end.

8. A non-transitory computer-readable storage medium storing computer instructions, wherein the computer instructions cause a computer to perform operations of:

in response to detecting a first event before receiving a playing instruction for a first live broadcast room, acquiring a first playing frame of the first live broadcast room during a live broadcast process of the first live broadcast room;

generating preloaded first kernel data according to the first playing frame;

in response to receiving the playing instruction for the first live broadcast room, pulling a live broadcast video stream of the first live broadcast room according to the first kernel data; and playing the live broadcast video stream of the first live broadcast room, wherein the acquiring a first playing frame of the first live broadcast room during a live broadcast process of the first live broadcast room comprises:

preloading live broadcast data of the first live broadcast room through a sub-thread until a video frame of the first live broadcast room is preloaded, and taking the video frame of the first live broadcast room loaded during the preloading as the first playing frame, wherein the generating preloaded first kernel data according to the first playing frame comprises:

acquiring a transparent transmission protocol and a data format of the first live broadcast room;

generating a decoder for decoding a received video stream of the first live broadcast room according to the transparent transmission protocol and the data format of the first live broadcast room, and a data format of a playing end; and generating the preloaded first kernel data according to the decoder and data of the first live broadcast room that has been acquired when the first playing frame is preloaded.

9. An electronic device, comprising:

at least one processor; and a memory communicatively connected to the at least one processor, wherein the memory stores instructions executable by the at least one processor, and the instructions, when executed by the at least one processor, enable the at least one processor to perform operations of:

in response to detecting a first event before receiving a playing instruction for a first live broadcast room, acquiring a first playing frame of the first live broadcast room during a live broadcast process of the first live broadcast room;

generating preloaded first kernel data according to the first playing frame;

in response to receiving the playing instruction for the first live broadcast room, pulling a live broadcast video stream of the first live broadcast room according to the first kernel data; and playing the live broadcast video stream of the first live broadcast room, wherein the acquiring a first playing frame of the first live broadcast room during a live broadcast process of the first live broadcast room comprises:

preloading live broadcast data of the first live broadcast room through a sub-thread until a video frame of the first live broadcast room is preloaded, and taking the video frame of the first live broadcast room loaded during the preloading as the first playing frame, wherein the generating preloaded first kernel data according to the first playing frame comprises:

acquiring a transparent transmission protocol and a data format of the first live broadcast room;

generating a decoder for decoding a received video stream of the first live broadcast room according to the transparent transmission protocol and the data format of the first live broadcast room, and a data format of a playing end; and generating the preloaded first kernel data according to the decoder and data of the first live broadcast room that has been acquired when the first playing frame is preloaded.

10. The electronic device of claim 9, wherein the pulling a live broadcast video stream of the first live broadcast room according to the first kernel data comprises:

acquiring an original video stream of the first live broadcast room according to the transparent transmission protocol of the first live broadcast room; and decoding the original video stream using the decoder, to obtain the live broadcast video stream of the first live broadcast room.

11. The electronic device of claim 9, wherein the first event comprises appearance of a live broadcast card of the first live broadcast room in a set display range of a playing end.

12. The electronic device of claim 9, wherein the instructions, when executed by the at least one processor, enable the at least one processor to further perform operations of:

while playing the live broadcast video stream of the first live broadcast room, acquiring a second playing frame of a second live broadcast room during a live broadcast process of the second live broadcast room;

generating preloaded second kernel data according to the second playing frame;

in response to detecting a set second event, pulling a video stream of the second live broadcast room according to the second kernel data; and playing the video stream of the second live broadcast room.

13. The electronic device of claim 12, wherein the set second event comprises switching from the first live broadcast room to the second live broadcast room.

14. The electronic device of claim 12, wherein the instructions, when executed by the at least one processor, enable the at least one processor to further perform an operation of:

in response to detecting a set third event, playing the video stream of the first live broadcast room and the video stream of the second live broadcast room synchronously.

15. The electronic device of claim 14, wherein the set third event comprises simultaneous appearance of a window corresponding to the first live broadcast room and a window corresponding to the second live broadcast room on a playing interface of a live broadcast playing end.

* * * * *